(12) United States Patent
McLin et al.

(10) Patent No.: US 6,358,650 B2
(45) Date of Patent: *Mar. 19, 2002

(54) CURRENT COLLECTOR HAVING A UNIFORMLY APPLIED LITHIUM POLYSILICATE PRIMER AND ASSOCIATED FABRICATION PROCESS

(75) Inventors: Michael McLin, Wakefield; Denis G. Fauteux, Acton, both of MA (US)

(73) Assignee: Mitsubishi Chemical Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/363,332

(22) Filed: Jul. 28, 1999

(51) Int. Cl.$^7$ .................................. H01M 4/64
(52) U.S. Cl. .................... 429/245; 429/233; 429/244; 429/234; 429/236; 429/231.95; 429/231.8; 29/623.5
(58) Field of Search ................. 429/245, 233, 429/244, 252, 231.95, 231.8, 234, 236; 29/623.5

(56) References Cited

U.S. PATENT DOCUMENTS

| 5,387,479 A | | 2/1995 | Koksbang |
| 5,437,941 A | | 8/1995 | Arledge et al. |
| 5,580,686 A | * | 12/1996 | Shi et al. ..................... 429/245 |
| 5,856,045 A | * | 1/1999 | Fauteux et al. ............. 429/232 |
| 6,087,045 A | * | 7/2000 | Fauteux et al. ............. 429/245 |

OTHER PUBLICATIONS

Cubberly et al., Glossary of Metallurgical Terms and Engineering Tables, p. 33, 1979.*

* cited by examiner

*Primary Examiner*—Stephen Kalafut
*Assistant Examiner*—Angela J. Martin
(74) *Attorney, Agent, or Firm*—Factor & Partners, LLC

(57) ABSTRACT

A primed current collector for use in an electrochemical cell comprising a current collector having a first surface and a second surface, and a primer applied to at least a portion of the first and/or second surfaces of the current collector, wherein the primer comprises a uniform layer of lithium polysilicate.

6 Claims, 3 Drawing Sheets

CURRENT COLLECTOR HAVING A UNIFORMLY APPLIED LITHIUM POLYSILICATE PRIMER AND ASSOCIATED FABRICATION PROCESS

BACKGROUND OF THE INVENTION

1. Field of the Invention

The present invention relates in general to electrochemical cells, and more particularly, to a current collector having a uniformly applied lithium polysilicate primer, which serves to, among other things, enhance the electrochemical performance of the same.

2. Background Art

Secondary electrochemical cells using a primer between the active material layer and the current collector of the electrode are well known in the art. However, conventional primers have not effectively addressed the problem associated with high interfacial resistance between the active material layer and the current collector. In particular, the lack of a thin, uniformly applied primer results in inconsistent electrical contact between the current collector and the active material layer, which has detrimental consequences relative to power density and cycle life of an associated electrochemical cell. In addition, convention primers that are fabricated from compounds other than lithium polysilicates are limited in their application to one type of electrode (i.e. an anode or cathode), but not both.

It is therefore an object of the present invention to provide a current collector having a thin, uniformly applied lithium polysilicate binder, to in turn, remedy the aforementioned complications and/or detriments associated with conventionally primed current collectors.

SUMMARY OF THE INVENTION

The present invention is directed to a primed current collector for use in an electrochemical cell comprising: (a) a current collector having a first surface and a second surface; and (b) a primer applied to at least a portion of the first and/or second surfaces of the current collector, wherein the primer comprises a uniform layer of lithium polysilicate.

In a preferred embodiment of the invention, the primed current collector further comprises means associated with the primer for exhibiting a uniform current response upon application of an electrical potential.

In another preferred embodiment of the invention, the primed current collector comprises a thickness ranging from approximately 0.5 microns to approximately 3.0 microns, and more preferably from approximately 1.5 microns to approximately 2.5 microns.

It is also contemplated that the primer further comprise a carbonaceous component, such as graphite, carbon black, or mixtures thereof. In this embodiment the carbonaceous component preferably comprises approximately 50 percent by weight of the primer.

Preferably the current collector if fabricated from a metal foil selected from one of the group consisting essentially of copper, aluminum and alloys thereof and has a thickness ranging from approximately 10 microns to approximately 25 microns.

The present invention is also directed to a process for fabricating a primed current collector comprising the steps of: (a) fabricating a current collector; (b) fabricating a primer, wherein the primer comprises lithium polysilicate; (c) controllably associating the primer with the current collector; and (d) at least partially drying the primed current collector.

In a preferred embodiment of the process, the step of fabricating the primer comprises the step of combining a solvent, lithium polysilicate, and a carbonaceous component.

In another preferred embodiment of the process, the step of controllably associating the primer with the current collector comprises the step of applying a coating of primer onto the current collector, wherein the dry thickness of the coating is approximately 0.5 microns to approximately 3.0 microns thick.

It is also contemplated that the step of at least partially drying the primed current collector comprises the step of exposing the same to a forced hot air oven at approximately 180 degrees Fahrenheit.

BRIEF DESCRIPTION OF THE DRAWINGS

The invention will now be described with reference to the drawings wherein.

DETAILED DESCRIPTION OF THE INVENTION

Figure 1:
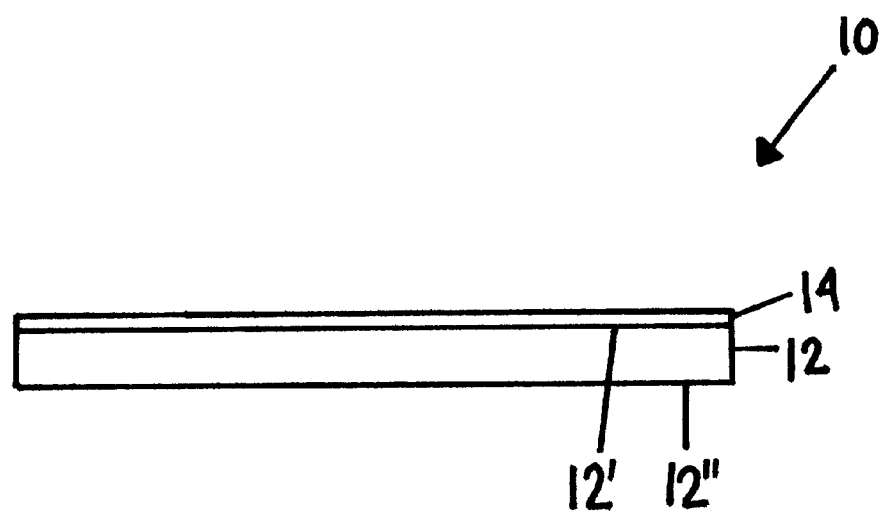
FIG. 1 of the drawings is a side view of a primed current collector in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

FIG. 1 shows a side view of primed current collector 10 in accordance with the present invention. Primed current collector 10 comprises current collector 12 and primer 14.

Current collector 12 is preferably a metal foil such as copper, aluminum, alloys of the same, and mixtures thereof. It will be understood, of course, that current collector 12 may be fabricated from any one of a number of materials—the only contemplated limitation is that the particular material must at least partially conduct electrical current and be electochemically compatable. Current collector 12 is preferably very thin metal foil having a thickness ranging from approximately 5 to approximately 25 microns.

As shown in FIG. 1, primer 14 is uniformly applied onto surface 12' of the current collector. It will be understood, however, that primer 14 may also be applied to surface 12" of current collector 12. Primer 14 is preferably fabricated from lithium polysilicate. Primer 14 may also be fabricated from lithium polysilicate in combination with other materials, such as conductive carbonaceous materials, including carbon black, graphite, and mixtures of the same. The carbonaceous material may comprise approximately 50 percent by weight of primer 14. For purposes of the present disclosure, the thickness of the primer can range from approximately 0.5 micros to approximately 3.0 microns, and preferably ranges from approximately 1.5 microns to approximately 2.5 microns. As will be discussed in greater detail below, primer 14 is applied to the current collector in such a uniform manner so that it exhibits a uniform current response upon application of an electrical potential. As such, when an electrical potential is applied to the primer, the current response will be substantially equal along the entire surface of the primer.

It will be understood that primed current collector 10 is intended for incorporation into a secondary electrochemical cell, such as a lithium ion electrochemical cell. Such a cell will include conventional components such as an anode, a cathode, and an electrolyte. In particular, primed current collector 10 is intended to be used in both the anode and cathode of a secondary battery. If associated with the anode, primed current collector 10 may comprise lithium polysilicate applies to a copper current collector, upon which a carbonaceous active material may be applied. Alternatively, if associated with the cathode, primed current collector 10 may comprise lithium polysilicate applied to an aluminum current collector, upon which a conventional cathodic active material may be applied. The cathodic materials may include, for example, $LiNiO_2$, $LiCoO_2$, and/or $LiMn_2O_4$.

The present invention is also directed to a process for fabricating a primed current collector comprising the following steps. First, a current collector is fabricated out of a conductive material, such as a metal including copper or aluminum. Second, a primer is fabricated which comprises lithium polysilicate and optionally comprises carbonaceous components. Third, the primer is controllably associated with the current collector. Examples of the controlled manner by which the primer is associated with current collector are provided hereinbelow in the experimental section of the disclosure. Finally, once the primer is applied to the current collector it is at least partially dried. Drying may occur in a conventional atmosphere at ambient temperature, but is preferably carried out in a forced air or convention type oven at elevated temperatures. The temperature range of the oven can vary greatly, however, the upper limit should be such that warping or bending of the primed current collector is minimized, or, at the very least, be eliminated all together.

In support of the present invention several experiments were conducted where in the following primer (coating fluid) was used:

| Component | % (by wt.) |
|---|---|
| KS-6 graphite | 9.03 |
| C-100 Carbon Black | 0.92 |
| 20% $LiSiO_x$ colloid in $H_2O$ | 34.69 |
| TX-100 | 0.34 |
| $H_2O$ | 55.0 |

It will be understood that each of the above-identified components is commercially available from LONZA, CHEVRON and ALDRICH chemical suppliers.

It should be noted that it is beneficial to agitate the coating fluid in a reservoir during the coating or application process to keep any carbonaceous particles suspended in solution. Next the fluid was metered using a Zenith pump. The output of the metering pump is then set to a slot die, wherein the flow rate was calculated to achieve a dried coating thickness of 1.5–2.5 microns. The slot die was set to a coating head angle of 12 degrees relative to a web of current collector. In a first experiment the current collector comprised copper and in a second experiment, aluminum. The web speed was set at 10 feet per minute. Once the primer or coating fluid was applied to the current collector, the primed current collector was dried in a convection oven having temperature set point of 182 degrees Fahrenheit, and a dew point set of 15.6 Fahrenheit. At this point the primer comprised approximately 50% by weight of carbonaceous material. Once dried the, primed current collector was configured with the following components for electrochemical testing:

| Component | Composition |
|---|---|
| Working electrode | Primed Al or Cu foil |
| Counter electrode | Lithium metal foil |
| Reference electrode | Lithium metal foil |
| Electrolyte | 1M solution of LiAsF6 in propylene carbonate with 5% succinic anhydride |
| Separator | Glass fiber mat |

Next, cyclic voltammetry was performed on the aluminum and copper primed current collectors, wherein the aluminum current collector was scanned from a starting voltage of 2.5 volts to a vertex voltage of 4.5 volts to an ending voltage of 2.5 volts at a scan rate of 10 mV/sec. The primed copper current collector was scanned from a staring voltage of 2.0 volts to a vertex voltage of 0.0 volts to an ending voltage of 2.0 volts at a scan rate of 10 mV/sec. The current response of the current collector versus the working electrode voltage was recorded and plotted (see FIGS. 2–3).

Figure 2:
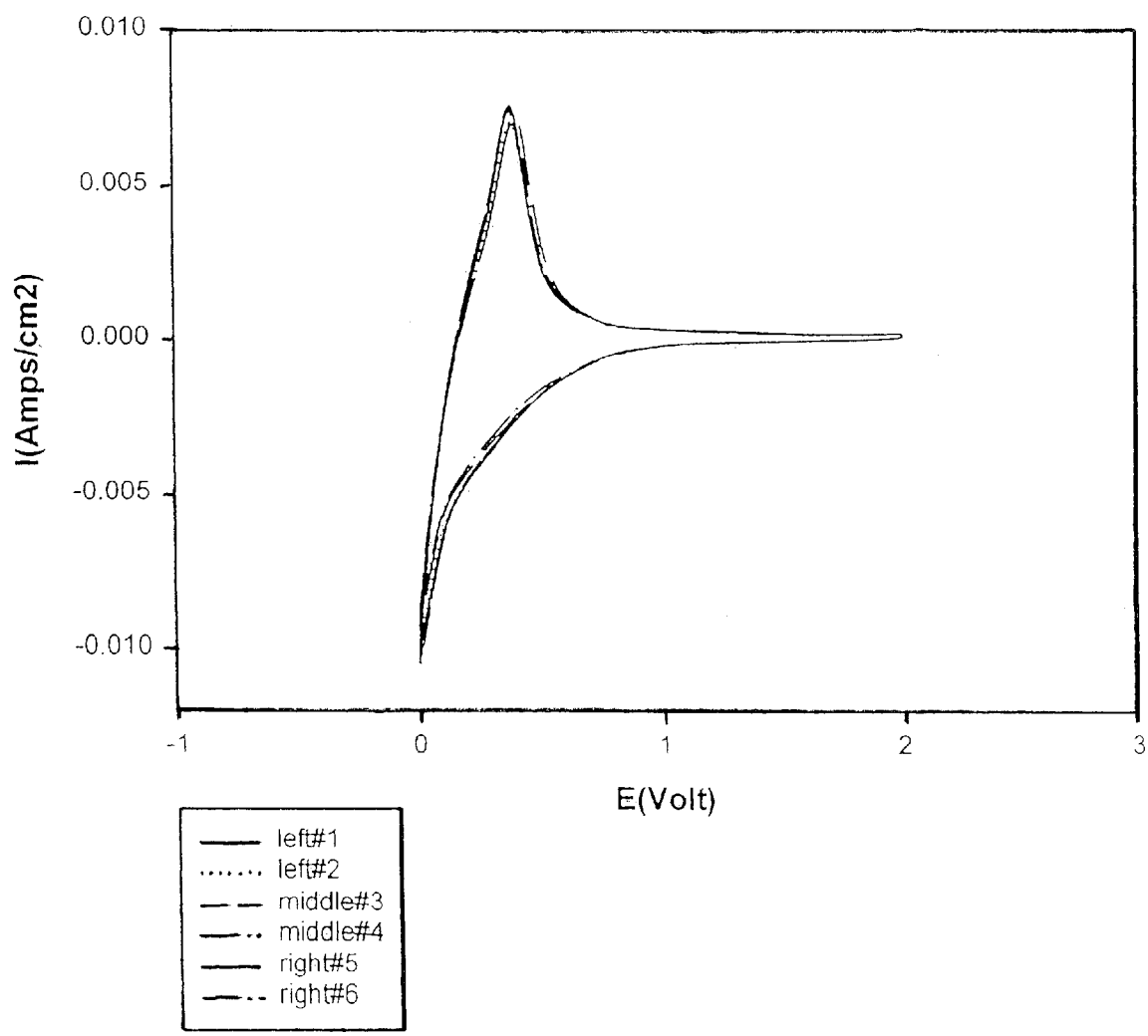
FIG. 2 of the drawing is a two-dimensional plot showing current response as a function of voltage for a cupper primed current collector in accordance with the present invention.
Figure 3:
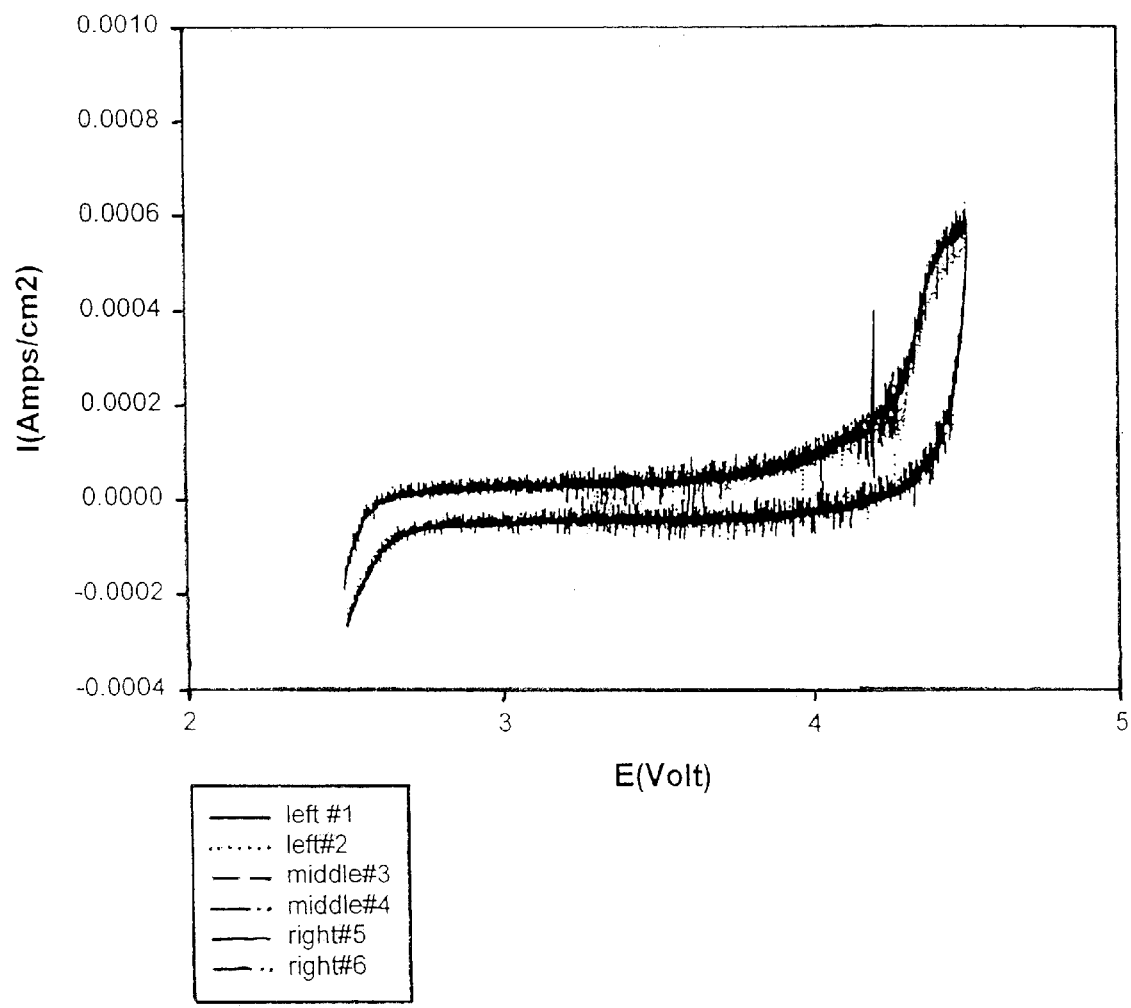
FIG. 3 of the drawing is a two-dimensional plot showing current response as a function of voltage for an aluminum primed current collector in accordance with the present invention.

As shown in FIG. 2, the copper current collector was sampled in two places along the web, and samplings at each location were taken at the left-hand side, right-hand side, and the center of the web. The cyclic voltammograms from the testing of the six samples are generally super-imposable, which indicates that the primer is uniformly coated along the current collector. It should be noted that this result is quite remarkable inasmuch as the primer is not only coated uniformly from the visual perspective, but also from the electrochemical performance perspective.

FIG. 5 shows the same results using an aluminum current collector, thereby demonstrating suitable application for both the anodic and cathodic components of an electrochemical cell.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. A primed current collector for use in an electrochemical cell, comprising:

a current collector having a first surface and a second surface; and a primer applied to at least a portion of the first and/or second surfaces of the current collector, wherein the primer comprises a uniform layer of lithium polysilicate, and wherein the primer comprises a carbonaceous component selected from the group consisting essentially of graphite, carbon black, and mixtures thereof, and further wherein the carbonaceous component comprises approximately 50 percent by weight of the primer.

2. An electrochemical cell, comprising:

an electrolyte;

a first electrode and a second electrode, wherein at least one of the first and second electrodes comprises:

a current collector having a first surface and a second surface; and a primer applied to at least a portion of the first and/or second surfaces of the current collector, wherein the primer comprises a uniform layer of lithium polysilicate, and wherein the primer comprises a carbonaceous component selected from the group consisting essentially of graphite, carbon black, and mixtures thereof, and further wherein the carbonaceous component comprises approximately 50 percent by weight of the primer.

3. A process for fabricating a primed current collector, comprising the steps of:

fabricating a current collector;

fabricating a primer, wherein the primer comprises lithium polysilicate;

applying a uniform layer of the primer onto the current collector via a slot die; and at least partially drying the primed current collector.

4. A primed current collector fabricated in accordance with the process of claim 3.

5. A primed current collector for use in an electrochemical cell, comprising:

a current collector having a first surface and a second surface; and a primer applied to at least a portion of the first and/or second surfaces of the current collector, wherein the primer comprises a uniform layer of lithium polysilicate applied via a slot die, which exhibits a current response, wherein the current response is uniform relative to left, center, and right surfaces of the primed current collector upon application of an electrical potential difference.

6. A primed current collector for use in an electrochemical cell, comprising:

a current collector having a first surface and a second surface; and a primer applied to at least a portion of the first and/or second surfaces of the current collector, wherein the primer comprises a uniform layer of lithium polysilicate applied via a slot die, which exhibits a current response, wherein the current response is superimposable relative to left, center, and right surfaces of the primed current collector upon application of an electrical potential difference.

* * * * *